UNITED STATES PATENT OFFICE.

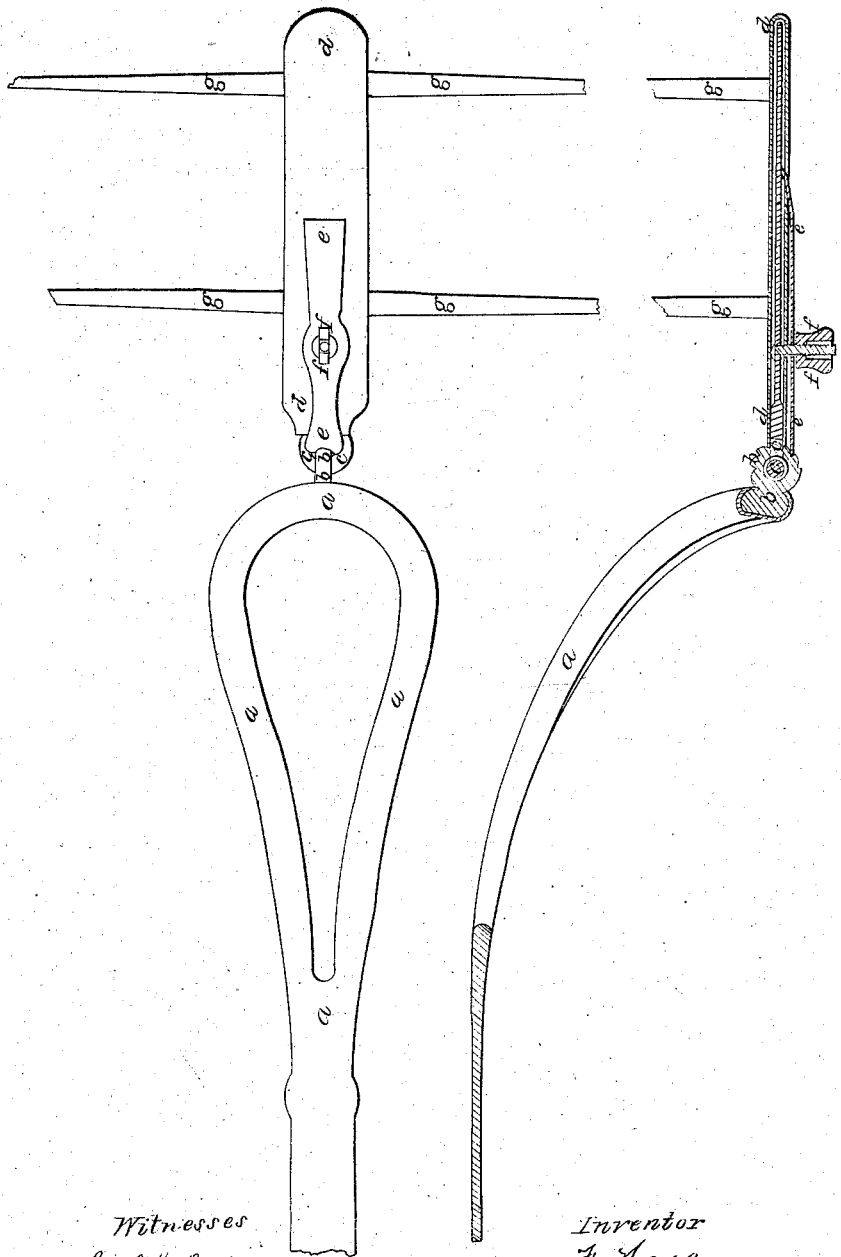

FREDERIC HOWES, OF BOSTON, MASSACHUSETTS.

IMPROVED CRUPPER.

Specification forming part of Letters Patent No. 47,953, dated May 30, 1865.

*To all whom it may concern:*

Be it known that I, FREDERIC HOWES, of Boston, in the county of Suffolk and State of Massachusetts, have invented certain new and useful Improvements in Cruppers for Horses; and I do hereby declare that the following description, taken in connection with the accompanying plate of drawings, hereinafter referred to, forms a full and exact specification of the same, wherein I have set forth the nature and principles of my said improvements, by which my invention may be distinguished from all others of a similar class, together with such parts as I claim and desire to have secured to me by Letters Patent.

It is well known to those having the care and management of horses that, in order to raise the horse's tail and to prevent the awkward and unseemly manner in which it is naturally carried by him, the operation of "nicking" or cutting through the depressor and part of the lateral muscle of the horse's tail is resorted to; also, that much annoyance and inconvenience are often experienced by the horse throwing his tail over the reins of the harness. To obviate these objections I have invented the following improvements, which I will now proceed to describe.

The present invention consists in combining with a crupper an extension bar or piece that elevates and supports the tail of a horse in any desired position. This bar is so connected with the crupper as to be susceptible of adjustment, whereby it can be set and held at any angle with the crupper, and yet allow the horse's tail to be left free to swing in a lateral direction.

The accompanying plate of drawings represents my improvements.

Figure 1 is a view of the under side of a crupper with my improvements attached. Fig. 2 is a central vertical longitudinal section through the same.

*a a a* in the drawings represent a crupper, at the end of which is a ratchet-ring, *b b*, which turns freely in a ring, *c c*, formed in one end of an extension bar or piece, *d d*. To the under side of this extension bar or piece *d d* a spring-pawl, *e e*, is attached, which works against and in the ratchet-ring *b b*, and is operated upon by thumb-screw *f f*, so as to hold it in position when set in the desired ratchet. The extension-piece *d d* is placed under the horse's tail, and is fastened to it by means of the leather strips *g g*. The spring-pawl *e e* is then placed in the ratchet according to the desired inclination of the tail, and fastened by screwing down the thumb-screw *f f* upon it. By this means the horse's tail is elevated and supported in a suitable position, and is kept from interfering with the reins of the harness.

It will be observed that other devices than that hereinabove designated may be adopted for connecting the extension bar or piece with the crupper.

Having thus described my improvements, what I claim as my invention, and desire to have secured to me by Letters Patent, is—

1. Combining with a crupper an extension bar or piece for the purpose of raising and supporting the tail of a horse, as set forth.

2. Making the supporting-bar adjustable, so that it can be set and held at any desired angle with the crupper, as set forth.

3. The combination of the ratchet-ring, extension-bar, and spring-pawl, as described.

FREDC. HOWES.

Witnesses:
JOSEPH GAVETT,
SAML. M. BARTON.